Dec. 17, 1935.   J. KOKOSKA   2,024,456
PARACHUTE
Filed Feb. 14, 1935
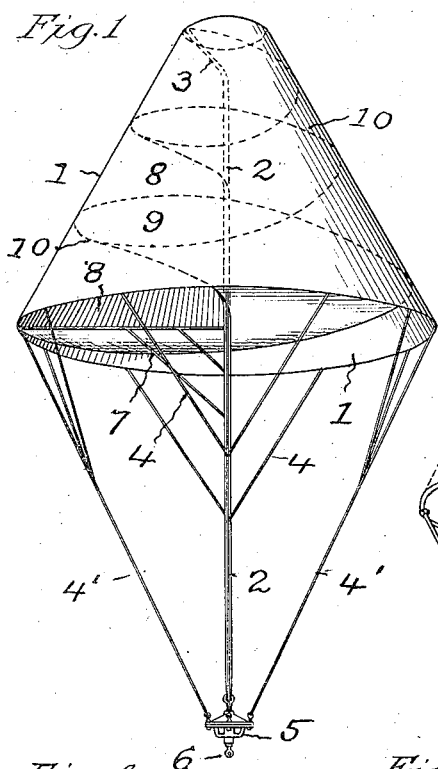
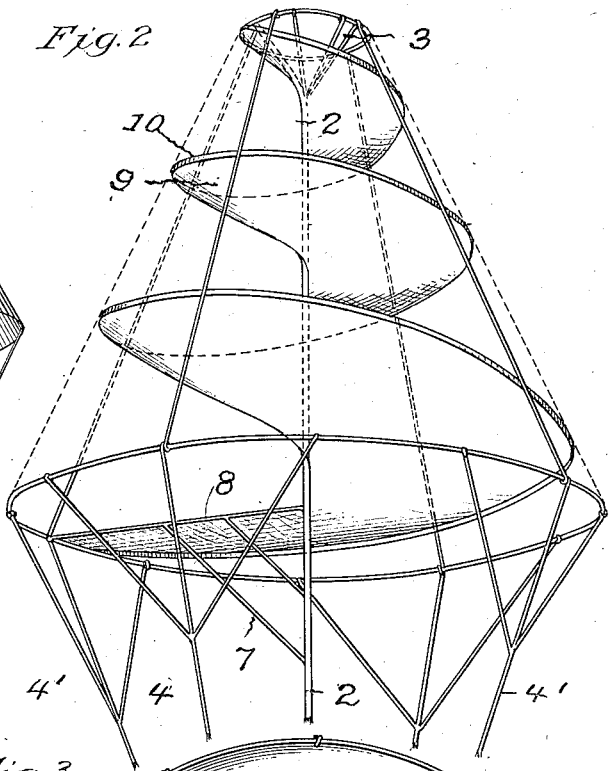
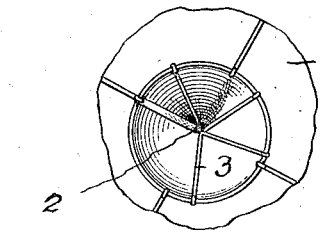
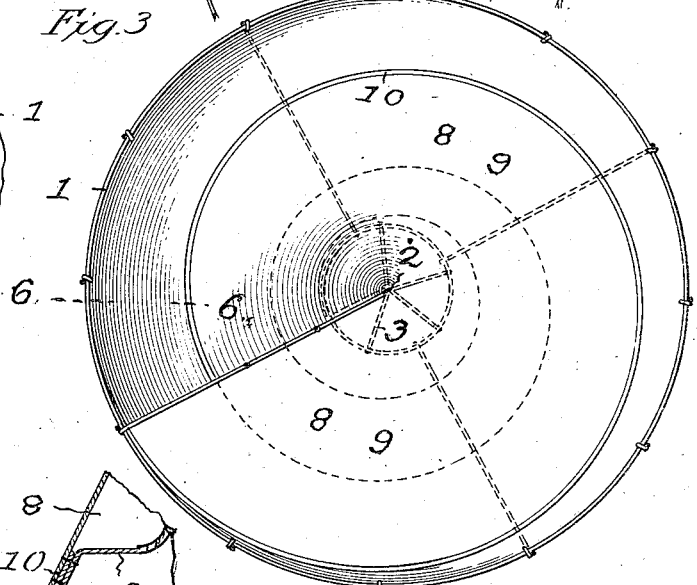
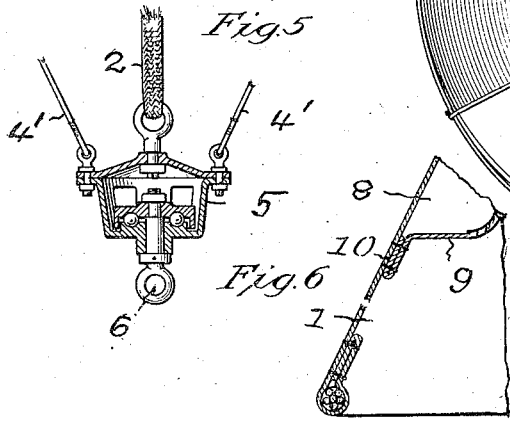
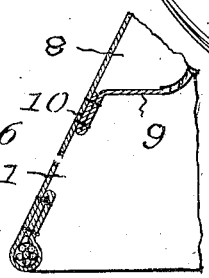
Inventor:
John Kokoska,
By Robert Burns
Atty.

Patented Dec. 17, 1935

2,024,456

UNITED STATES PATENT OFFICE 2,024,456

PARACHUTE

John Kokoska, Cicero, Ill.

Application February 14, 1935, Serial No. 6,533

3 Claims. (Cl. 244—21)

This invention relates to that type of parachutes which are formed of a woven or like fabric, so as to be capable of being folded into a compact form when not required for actual use and which are adapted to automatically open up into an extended condition in actual use to afford the required retarding effect against a too rapid descent in the use of the parachute as a safety means. And this improvement has for its object:

To provide a structural formation and combination of parts and features in a parachute of the above mentioned type adapted to provide a simple and efficient construction whereby a revoluble movement of the parachute in relation to a non-revoluble movement of the associated harness in which a party making a descent is effectively attained, all as will hereinafter more fully appear.

In the accompanying drawing:

Fig. 1 is a perspective view of a parachute having the preferred form of this invention applied.

Fig. 2 is a similar view of the same, with the main covering removed to illustrate the interior portion of the device.

Fig. 3 is an inverted plan of the structure.

Fig. 4 is a fragmentary bottom view of the upper portions of the parachute.

Fig. 5 is a detail sectional elevation of the connecting coupling or shackle between the central cable of the parachute and the cable of the carrying harness for the user for providing for independent rotation of the parachute.

Fig. 6 is a detail section on line 6—6 Fig. 3.

Like reference numerals indicate like parts in the several views.

In the preferred construction shown, the covering or outer wall 1 of the parachute is of woven or like flexible fabric and is of hollow truncated cone shape open at top and bottom. Said wall or covering 1 is provided with the usual centrally arranged main cable 2 attached at its upper end by diagonal cords 3 to the margin of the opening at the upper end of the covering or wall 1.

Midway its vertical height, said main cable 2 is connected by diagonal cords 4 with the margin of the open lower end of said covering or wall 1, while at its lower end said main cable is attached to the revoluble member of a shackle or coupling 5, the non-revoluble member 6 of which is adapted for connection with the harness in which the user is carried. The function attained by such arrangement is a free rotation in a horizontal plane of the parachute in actual use, independent of a non-rotatable condition necessary on the part of the carrying harness and the occupant of said harness.

Diagonal cords 4' connect the revoluble member of the coupling 5 with the margin of the open bottom of the main covering or wall 1 for aiding in attaining greater stability between the parts.

In addition the main cable 2 is connected by one or more pull cords 7 with the inlet of the passage way or air conduit of this improvement now to be described.

Preferably in the interior of the truncated cone shaped main covering or wall 1, shown in the drawing, a spiral passageway or air conduit 8 of a gradually decreasing area is formed by a lining sheet 9 of woven or like fabric with a spiral row of thread stitches 10 so as to form a gradually decreasing area to the air conduit 8 from the inlet to the outlet of said duct.

In the above described construction, the upper end of the spiral air duct opens into the outer atmosphere through the central orifice of the main covering or wall 1.

The operation of this invention in making a safety descent is as follows:

The main covering or wall 1 will automatically assume an extended spread condition and during a rapid descent air will forcibly enter the lower and inlet end of the spiral air conduit 8, and, assuming a spiral travel therein, will be forcibly discharged from the upper and outlet end of said conduit in an oblique direction into the outer atmosphere and impart rapid rotation to the parachute as a whole, independent of the user and the harness by which connection is had with the lower end of the parachute.

It is within the scope of this invention to arrange the spiral passageway or air conduit 8 on the exterior of the main covering or wall 1 in substantially the same manner as that heretofore described of the preferred form of the invention. In such modified application, the sheet of woven fabric and spiral row of thread stitches by which the spiral air conduit is provided are applied in like manner to the exterior of the main covering or wall 1 with the air inlet to the lower end of the air conduit so formed extending through said covering or wall into the interior of the parachute.

Having thus fully described my invention, what I claim as new, is:—

1. An aerial parachute comprising a main covering sheet or wall of woven or like fabric adapted to assume an inverted open bottom cupped form in actual use, a sheet of woven or like fabric secured to said main covering by a spiral row of thread stitches to form a spiral passageway or air conduit between said sheets, the inlet of which is in the interior of the parachute and outlet is into the outer atmosphere in an oblique direction adapted to impart rotation to the parachute in making a safety descent therewith.

2. In an aerial parachute as specified in claim 1, wherein the main covering or wall is of a truncated cone form open at bottom and top.

3. In an aerial parachute as specified in claim 1, wherein the spiral passageway or air conduit has a progressively decreasing area from its inlet end to its outlet end.

JOHN KOKOSKA.